United States Patent [19]

Frangineas, Jr.

[11] Patent Number: 5,033,853
[45] Date of Patent: Jul. 23, 1991

[54] APPARATUS FOR AUTOCORRELATING OPTICAL RADIATION SIGNALS

[75] Inventor: George Frangineas, Jr., Mountain View, Calif.

[73] Assignee: Coherent, Inc., Palo Alto, Calif.

[21] Appl. No.: 335,922

[22] Filed: Apr. 10, 1989

[51] Int. Cl.⁵ .............................................. G01B 9/02
[52] U.S. Cl. .................................................. 356/346
[58] Field of Search .................. 356/346; 350/6.5, 6.6

[56] References Cited

U.S. PATENT DOCUMENTS

| | | | |
|---|---|---|---|
| 3,516,743 | 6/1970 | McKown et al. | 350/6.6 X |
| 4,190,366 | 2/1980 | Doyle | 356/346 |
| 4,406,542 | 9/1983 | Boggy et al. | 356/345 |
| 4,472,053 | 9/1984 | Wyatt et al. | 356/121 |
| 4,628,473 | 12/1986 | Weaver | 364/822 |
| 4,772,118 | 9/1988 | Liu et al. | 356/121 |
| 4,795,253 | 1/1989 | Sandridge et al. | 356/51 |

OTHER PUBLICATIONS

Ishida et al., "Rapid-Scan Autocorrelator for Monitoring cw Mode-Locked Dye Laser Pulses", *Jap. J. Of Appl. Phy.*, vol. 19, No. 6, pp. L289–L292, 6/1980.
Harde et al., "Rapid Scanning Autocorrelator for Measurements of Picosecond Laser Pulses", *Opt. Commun.*, vol. 38, No. 3, pp. 211–216, 8/1981.
"Real-Time Intensity Autocorrelation Interferometer", R. L. Fork and F. A. Beisser, *Applied Optics*, vol. 17, No. 22, Nov. 15, 1978.

*Primary Examiner*—Davis L. Willis
*Assistant Examiner*—Matthew W. Koren
*Attorney, Agent, or Firm*—Limbach, Limbach & Sutton

[57] ABSTRACT

An apparatus (12) generates information about the width of pulses in an optical train using an autocorrelation technique. In the apparatus, the incoming beam (10) is split into two paths (10a, 10b). The path length of one of the beams (10b) is varied using a reciprocating stage (40) having a reflector (50) mounted thereon. The stage is driven by a cam (42) rotating at a constant speed. A portion (42b) of the curvature of the cam is arranged such that the distance between the rotational axis (44) of the cam and the stage varies proportionally with the rotational angle of the cam such that the path length of the beam will change at a constant rate. The two beams are then recombined in a second harmonic generation crystal (28) which generates an output signal. The output signal is monitored by a photodetector (30) and may be displayed on an oscilloscope to provide a measurement of the pulse width of the input pulses.

28 Claims, 8 Drawing Sheets

SH. 2 OF 8

APPARATUS FOR AUTOCORRELATING OPTICAL RADIATION SIGNALS

TECHNICAL FIELD

The subject invention relates to an apparatus and method for measuring the duration of short pulses of optical radiation by an autocorrelation technique.

BACKGROUND OF THE INVENTION

There exists a number of commercially available lasers capable of generating short pulses of radiation having a duration in the picosecond range. In order to develop, test, optimize and utilize such lasers, it is necessary to measure the length of these short pulses. Pulses in the picosecond regime are too short to be measured by conventional photodetectors. Accordingly, devices have been developed for measuring these pulses which rely on a technique known as autocorrelation.

Autocorrelation can briefly be described as a measurement system for developing a composite image of a periodic waveform through combination of the measured signal with itself over a range of time delays between the signals. The beam of light consisting of a stream of pulses is divided into two parts and recombined later downstream. Prior to recombination, a varying time delay is introduced between the two beams. When the beams are rejoined the magnitude of the combined beam provides information about the original signal.

When the two signals are identically synchronized (i.e. with peaks overlapping), the combination will produce a pulse train of essentially equal pulses. If, however, the two pulse trains are out of sync by more than their pulse width, the signal will be zero. When the pulse trains are out of sync by a fraction of their pulse width, the product will be greater than zero but less than when the pulse trains exactly coincide.

The object of autocorrelation is to produce a series of varied delays between two pulsed beams. At each selected delay, the combined signal is measured. A series of such measurements provides an image of the pulses which can be displayed on an output device such as an oscilloscope or computer printer.

In prior art devices relying on the autocorrelation technique, the two pulsed beams are typically recombined in a second harmonic generator crystal. When the pulses in two beams overlap, the crystal will generate a second harmonic output. The amplitude of the second harmonic output is detected with a photodetector. While the photodetector can not respond fast enough to record the combination of any particular pair of pulses from the two beams, it will generate a signal proportional to the combination of the pulses averaged over a series of pulses. The level of this averaged output signal will vary as the time delay is varied. The output signal of the photodetector is supplied to a oscilloscope.

In the prior art devices relying on an autocorrelation technique for measuring pulse width, some means must be provided to delay one of the two optical beams. One approach for introducing an optical delay is to direct the beam through a rotating glass block. As the block rotates, the path length of the beam is varied such that a varying time delay will be produced.

One example of a device using a rotating glass block can be found in U.S. Pat. No. 4,406,542 issued Sept. 27, 1983, to Boggy et al. In this particular device, both of the beams are directed through the rotating block to insure that a substantially linear time delay is introduced. As stated in the Boggy patent, it is extremely desirable to produce a linearly varying delay in order to facilitate proper calibration on the oscilloscope. As can be appreciated, an oscilloscope has a uniform rate of sweep in the horizontal direction. If the variation of the delay between the two beams was non-linear, the waveform on the oscilloscope would be distorted and have to be corrected. Accordingly, by generating a linearly varying delay, calibration and measurement are substantially simplified.

The autocorrelator described in the Boggy patent is designed to measure pulse widths between 1 and 100 picoseconds in duration. In order to measure the length of longer pulses, the block would have to be made thicker to create greater delays. Unfortunately, if the block was made thicker, it would also become heavier which could create problems in mounting the block and maintaining a constant speed of rotation. The Boggy device is also incapable of measuring shorter pulses because of group velocity dispersion effects which occur in the glass block. For these reasons, the device described in Boggy is limited to measurement of pulse widths over a relatively short range. It would be desirable to provide a device which can measure both relatively short pulse widths as well as significantly longer pulse widths. To applicant's knowledge there is no device on the market which can provide autocorrelation for pulse widths over a range between 50 femptoseconds and 350 picoseconds.

Other prior art autocorrelators are described in U.S. Pat. No. 4,472,053 issued Sept. 18, 1984 to Wyatt et al. and U.S. Pat. No. 4,628,473 issued Dec. 9, 1986 to Weaver. In both of the latter two patents, a delay is introduced into the signal without moving parts. In the Wyatt design, a diffraction grating is used to introduce a continuous differential time delay along the spatial width coordinate of the beam. In the Weaver device, the beam is passed through an electrooptic crystal whose index of refraction is responsive to an electric field. As the index of refraction is varied, the delay of the beam passing through the crystal is varied. Both of the latter devices are also limited to measuring the duration of pulses over a relatively narrow measurement range.

Accordingly, it is an object of the subject invention to provide a new and improved autocorrelator apparatus.

It is another object of the subject invention to provide an improved means for delaying an optical beam in an autocorrelator device.

It is a further object of the subject invention to provide a new and improved autocorrelator that can measure pulse widths from 50 femptoseconds to 350 picoseconds.

It is still another object of the subject invention to provide a new and improved autocorrelator which includes a means for translating a stage at a constant velocity.

It is still a further object of the subject invention to provide a means for varying the path length of an optical beam.

It is still a further object of the subject invention to provide a means for changing constant rotational movement into constant linear motion.

It is still another object of the subject invention to provide a novel cam and cam follower arrangement that imparts constant linear motion to a stage carrying a reflector in order to create a delay in an optical beam which varies constantly over time.

SUMMARY OF THE INVENTION

In accordance with these and many other objects, the subject invention provides for a means for delaying an optical beam which is particularly suited for use in an autocorrelation device. The device is designed to provide an autocorrelation signal of an input beam comprised of relatively short optical pulses of laser energy.

In the subject device, the beam to be measured is first divided into two parts. One of the two parts is passed through a new and improved means for introducing a variation in the path length of the beam. The two beams are then recombined to generate an autocorrelation signal that is supplied to an oscilloscope.

In accordance with the subject invention, the means for introducing the delay in the optical beam path includes a reciprocating, spring loaded, linear translation stage having a reflecting element mounted thereon. The beam to be delayed is directed to the reflecting element along a path substantially parallel to axis of the movement of the translation stage. As the translation stage is moved, the path length of the beam is varied.

As discussed above with respect to the Boggy patent, it is particularly important to provide a system where the rate of change of the path length, and therefore the variation in the time delay is constant. This result can only be achieved if the stage is translated with a constant velocity. The means for translating the stage at a constant velocity is provided by a novel rotating cam and cam follower combination. The cam follower is mounted on the stage such that in operation, the rotation of the cam will cause the stage to reciprocate. In order to convert the rotational motion of the cam into constant velocity linear motion of the stage, a portion of the surface of the cam has a curvature configured such that the distance between the cam follower and the axis of rotation of the cam will vary proportionally with the rotational angle of the cam. The period during which the stage is driven by this portion of the cam surface defines the region where the active scanning of the output of the photodetector should take place.

Because the stage reciprocates, there are portions at the beginning and end of the active scanning region where the stage must be accelerated to the scanning velocity and decelerated down to zero velocity to permit the return trip in the opposite direction. Accordingly, the surface of the cam must also include curvatures to generate this acceleration and deceleration phases. In the preferred embodiment, the curvature of these portions of the cam are designed to constantly accelerate and later constantly decelerate the stage to minimize vibration.

In the preferred embodiment, a two-lobbed cam is utilized with each lobe of the cam having two surface areas which can be used to translate the stage over a given distance at a fixed rate of speed. Each time the stage is moved through this given distance, a scan is performed and output information is sent to the oscilloscope. The cam is rotated at roughly 200 rpm to provide 800 scans per minute such that autocorrelation of the input pulses can be performed on a real time basis.

In the prior art, a linear translation stage has been used to introduce a time delay in an optical beam. However, the means for driving the stage was a scanning stepper motor. Conventional scanning stepper motors can only move the stage relatively slowly and in small increments and therefore could not be used to generate data at a fast enough rate to be useful in monitoring a laser. Accordingly, the latter arrangement cannot provide any real time measurement of the width of the pulses in the input beam. Another approach which could be used to linearly translate an object would include a push-pull transducer. However, these devices have not used heretofore in optical delay lines since their range of motion is too short and they do not generate sufficient force to move a stage having a reflecting optic.

The subject cam and reciprocating stage arrangement can be used in devices other than autocorrelators which require a means for introducing a delay in an optical path. One example of such device is a Michelson type interferometer used in spectrometry. U.S. Pat. No. 4,190,336 issued Feb. 26, 1980 to Doyle discloses an interferometer wherein a time delay is introduced by moving a triangular wedge across a beam. This mechanism can be replaced with the reciprocating cam driven stage of the subject invention. Other uses for the subject invention can be found in the field of time resolved spectroscopy wherein two or more beams are delayed with respect to each other.

Further objects and advantages of the subject invention will become apparent from the following detailed description taken in conjunction with the drawings in which:

DETAILED DESCRIPTION OF THE PREFERRED EMBODIMENT

Figure 1:
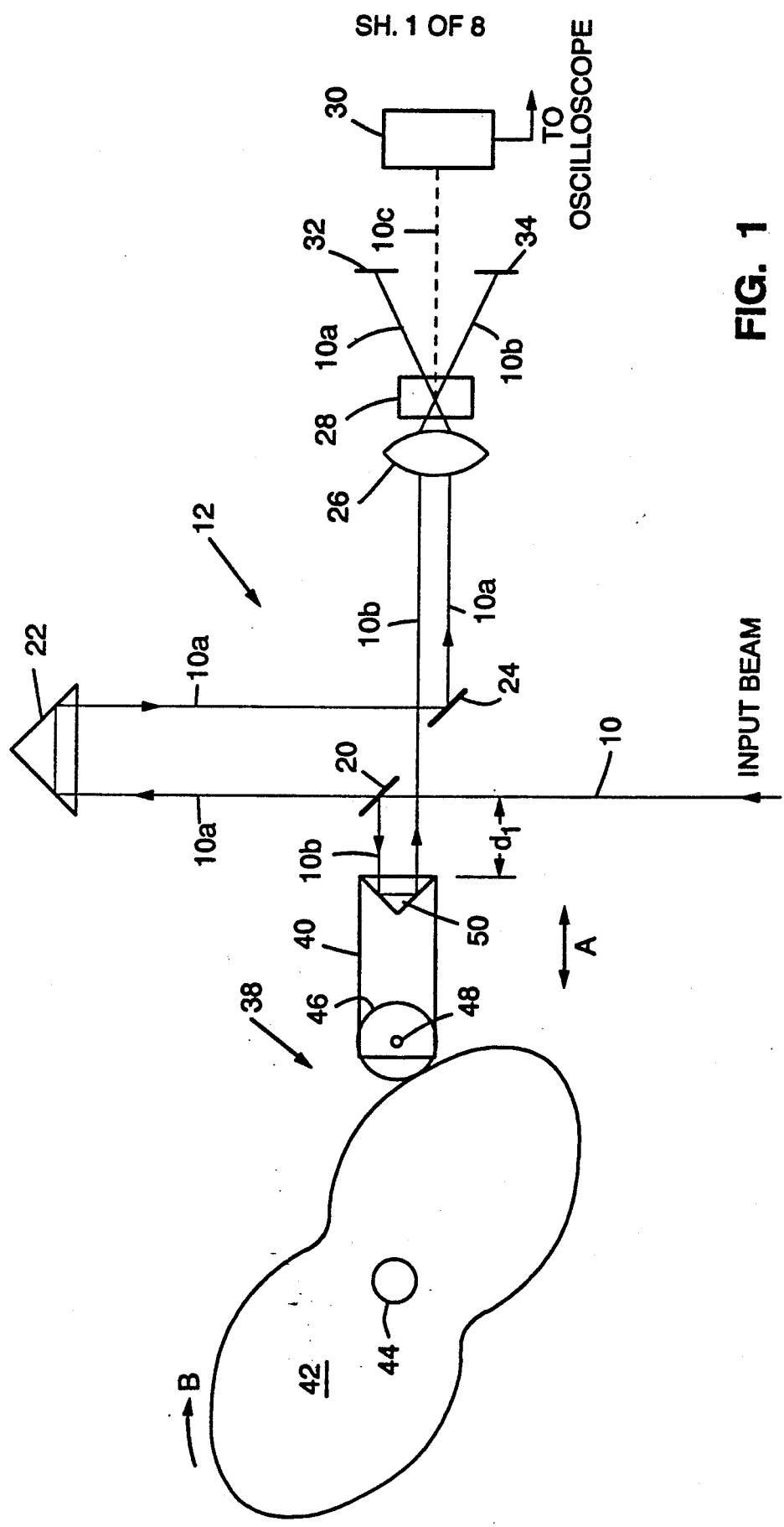
FIG. 1 is a simplified illustration of the beam path of an autocorrelator incorporating the subject invention and showing the cam and stage in a intermediate position within the active scanning region.

Referring to FIG. 1, there is illustrated a schematic layout of a device 12 for producing information about the width of short optical pulses in an input beam 10 utilizing an autocorrelation technique. The input beam 10 is of the type which might be generated by a laser operating in mode locked fashion to generate a train of pulses each having a pulse width from 50 to 350 picoseconds in duration.

The input beam 10 is first directed to a 50—50 beam splitter 20 for creating two separate beams 10a, 10b of approximately equal energy. Beam 10a continues along its original path until it reaches a retroreflecting prism 22. Beam 10a experiences two internal reflections within prism 22 so that it is redirected outwardly parallel to, but displaced from, the input beam. Beam 10a is then redirected through 90° by a reflector 24 positioned at 45°.

Beam 10a is then focused by a lens 26 onto a second harmonic generating crystal 28. Second harmonic generating crystal is of the type which will generate an output beam 10c which is double the frequency of the input beams if the input beams are properly phase matched with the crystal. The frequency doubled output 10c of the crystal 28 is measured by photodetector 30. A portion of the input beam 10a will always remain in an unconverted state and can be absorbed with a beam stop 32. A second beam stop 34 is provided to absorb any portion of the second beam 10b which has not been doubled.

Figure 6:
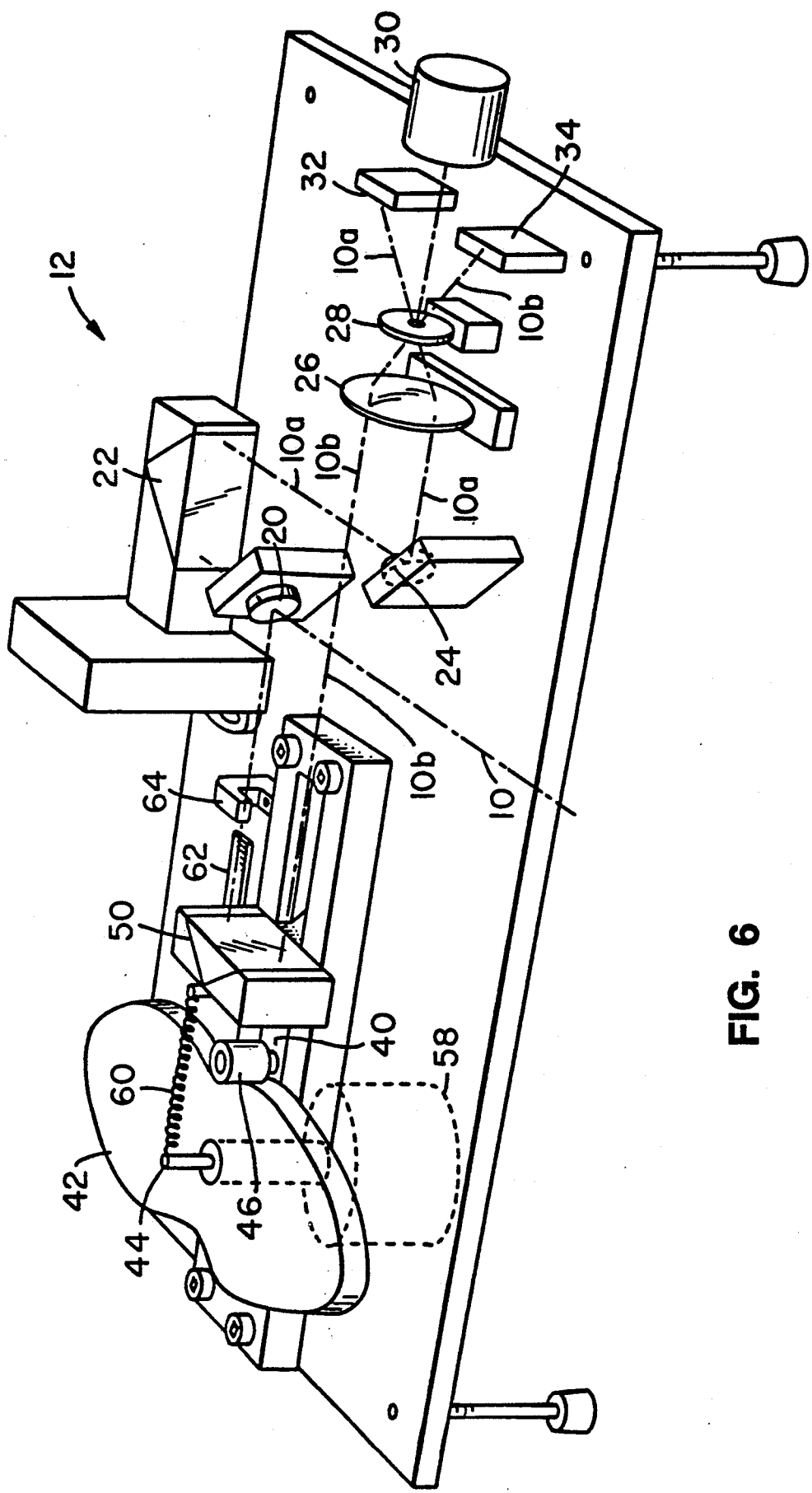
FIG. 6 is a perspective view of a preferred embodiment of an autocorrelator device formed in accordance with the subject invention.
Figure 7:
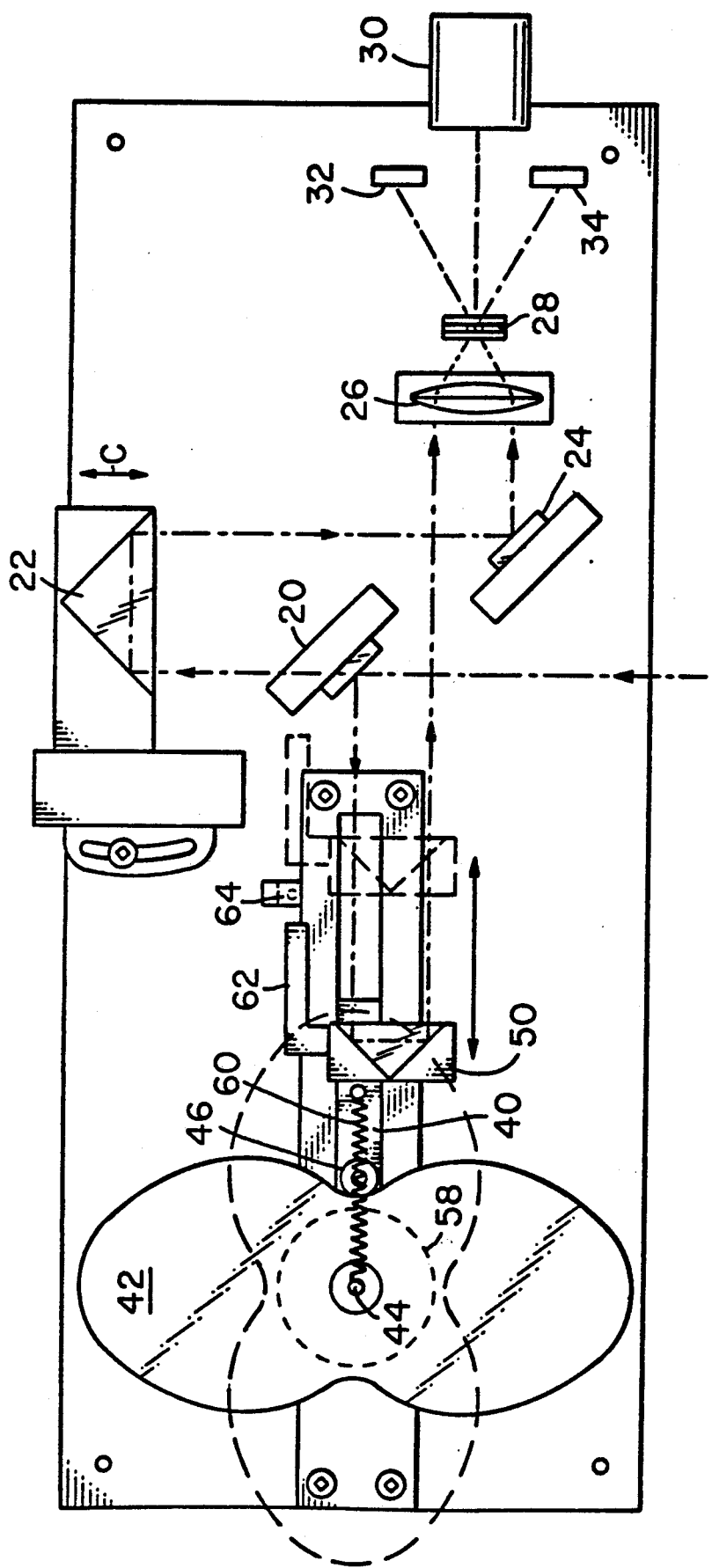
FIG. 7 is a top plan view of the autocorrelator shown in FIG. 6.

Beam splitter 20 functions to generate and redirect a second optical beam 10b towards a means 38 for introducing a delay into the optical beam path. This means 38 includes a stage 40 which reciprocates along an axis shown by arrows A in FIG. 1. The movement of stage 40 is induced by a cam 42 which rotates clockwise about an axis 44 as shown by arrow B. Stage 40 is provided with a cam follower 46 mounted for rotation about an axis 48. As can be seen when viewing FIGS. 1-3 in combination, as cam 42 rotates, stage 40 will move linearly back and forth along the axis shown by arrows A. In the preferred embodiment, a biasing means such as a spring is connected between the cam and the stage to maintain contact between the elements as shown in FIGS. 6 and 7 discussed below.

In accordance with the subject invention, a means for intercepting and redirecting beam 10b is mounted on the stage. In the illustrated embodiment this means is provided by a retroreflecting prism 50. Prism 50 reflects beam 10b along a path parallel to but spaced from the incoming beam. Beam 10b is directed to and then focused by lens 26 into doubling crystal 28.

As shown in FIG. 1, both beams 10a and 10b enter the crystal 28. Where the pulses in the beams overlap, a frequency doubled output beam 10c will be generated along a path that bisects the incidence angles of the two input beams 10a and 10b. The amount of energy which is converted to the second harmonic frequency is dependent on the amount of overlap of the pulses in the input beams. Output beam 10c is directed to photodetector 30 which generates an output signal proportional to the beam intensity. This output signal is gated to an oscilloscope for display and measurement of the autocorrelated trace as discussed in greater detail below.

Figure 2:
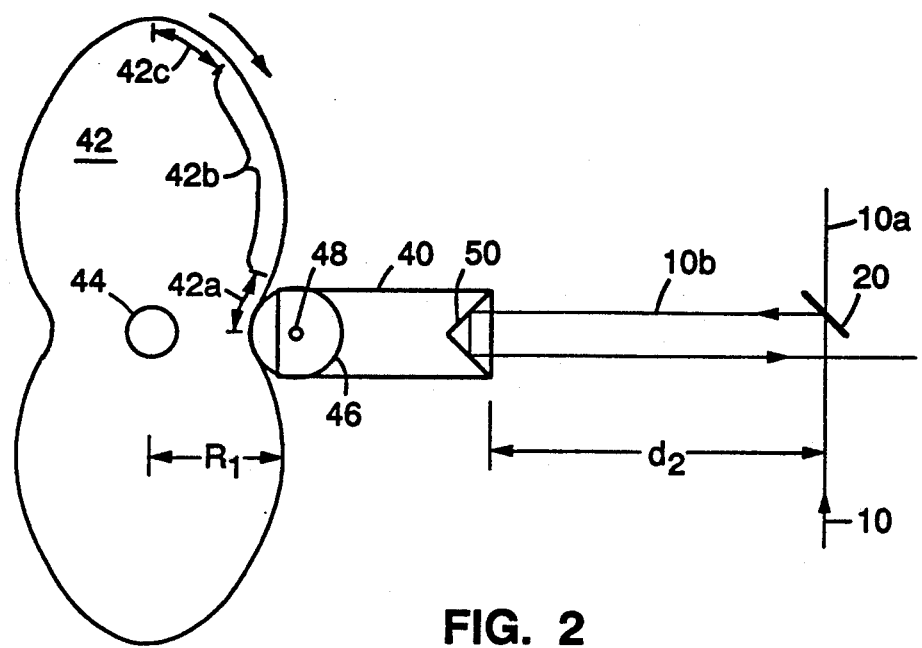
FIG. 2 is an illustration of the cam and stage combination with the stage being shown at one end of its travel.
Figure 3:
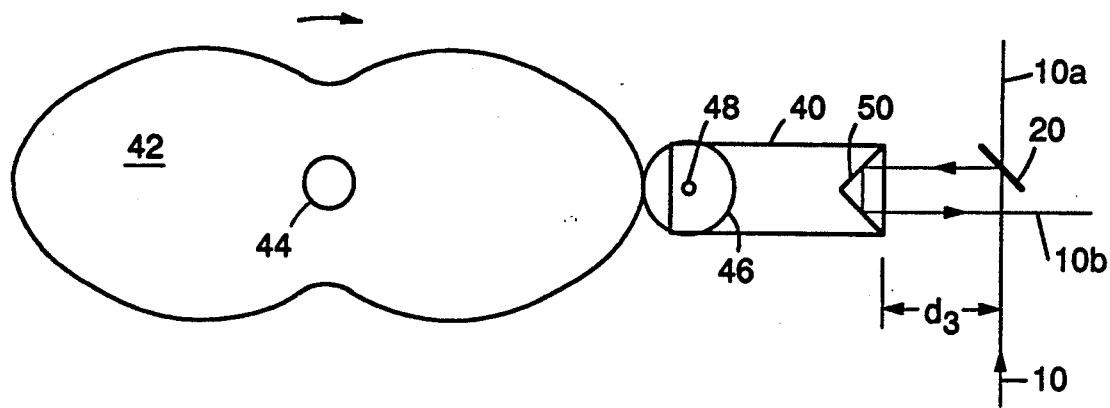
FIG. 3 is an illustration similar to FIG. 2 showing the stage at the opposite end of its travel.

As can be appreciated, the movement of stage 40 will vary the path length of beam 10b, from the reflector 20 to lens 26. The shortest path length is illustrated in FIG. 3 where the stage is shown in the far right position. The path length will include the distance $2(d_3)$, or twice the distance between the reflector 20 and prism 50. As the stage moves to the left and into the position shown in FIG. 1, the path length increases by an amount that is twice the difference between $d_1$ and $d_3$ or $2(d_1)-2(d_3)$. Similarly, when the stage is at the far left of its travel, as shown in FIG. 2, the added path length as compared to FIG. 3 would be $2(d_2)-2(d_3)$.

As noted above, the linear movement of stage 40 is induced by the rotation of cam 42. The velocity and acceleration characteristics of the stage are dependant upon the curvature of the surface of the lobes of cam 42. In accordance with the subject invention, the surface of the cam is configured in a manner such that a significant portion of the movement of the stage will be at a constant velocity. By this arrangement, the change in the path length of the optical beam will be constant over a given interval. A constant rate of change is necessary in order to be able to easily calculate the pulse width of the input beam by measuring the width of the pulse on an oscilloscope which has a uniform horizontal rate of sweep.

In order to generate a constant linear velocity, a portion of the surface of the cam is designed such that the distance between the axes of rotation of the cam 44 and cam follower 48 varies in direct proportion to the rotational angle of the cam. This relationship is shown graphically in FIG. 4 where the radial distance between the axes of the cam and the cam follower is shown on the vertical axis and the rotation angle of the cam, measured in radians, is shown on the horizontal axis. The radial distance between the axes of the cam and cam follower changes in exactly the same way as the position of the stage. The cam position where the radial distance $R_1$ is at a minimum and the rotational angle $\theta$ is equal to zero is shown in FIG. 2. The cam position where the radial distance is at a maximum and the rotational angle $\theta$ is $\pi/2$ radians or 90°, is represented in FIG. 3.

As the cam rotates, the stage will be accelerated from rest to the scanning velocity. In order to maximize the linear distance where the scan is at constant velocity, the acceleration phase (as well as the deceleration phase) of the 90° cycle should be minimized. In the preferred embodiment, the stage is accelerated to the scanning velocity in the first 15 percent of the 90° of rotation or 0.235 radians as shown by line 100 in FIG. 4. This area on the cam is shown as surface 42a in FIG. 2.

Figure 4:
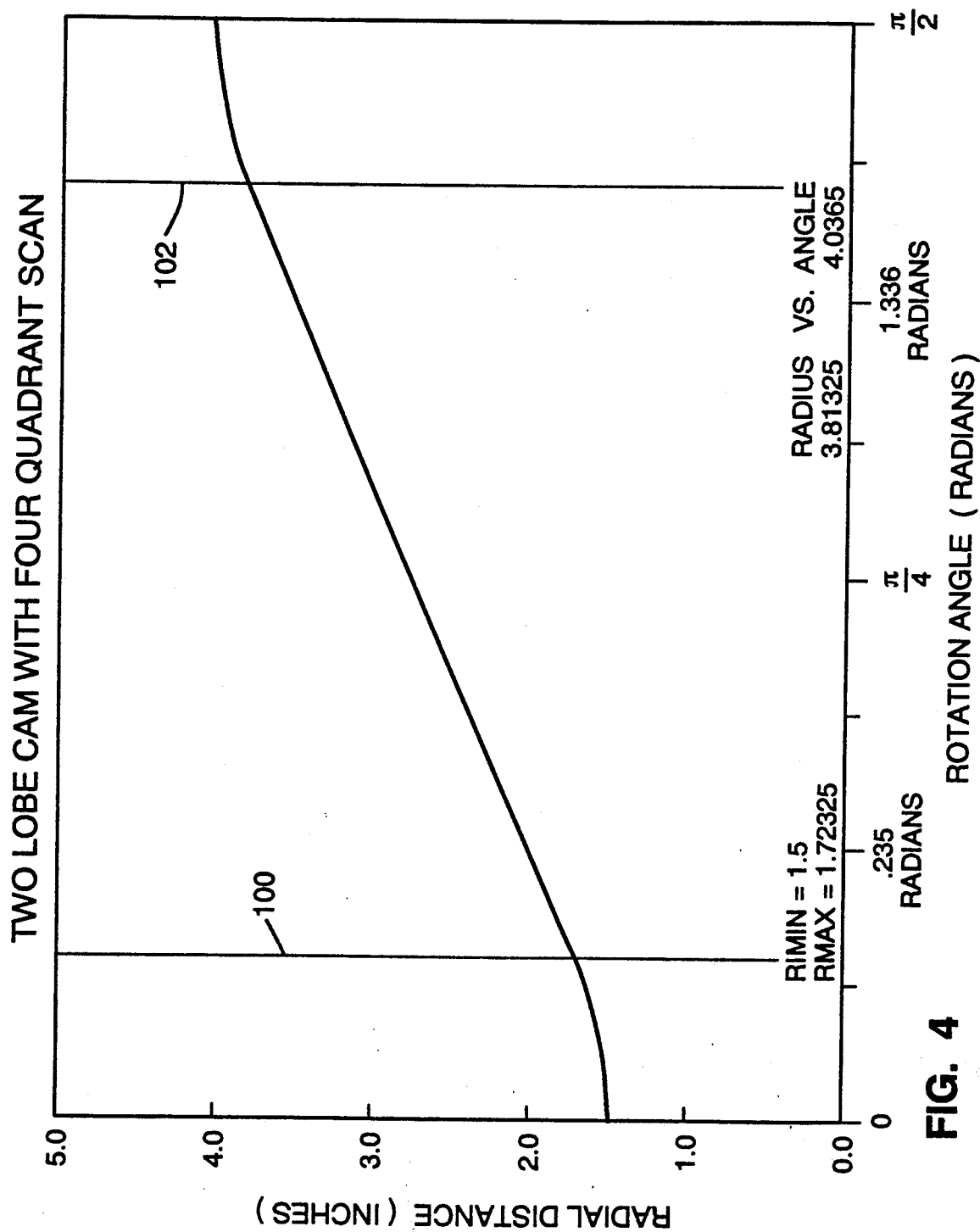
FIG. 4 is a graph plotting the displacement of the stage with respect to the rotational angle of the cam.

The distance between line 100 and 102 in FIG. 4 represents 70 percent of the 90° cycle or 1.1 radians and is shown in FIG. 2 as area 42b on the cam. Area 42b provides for the constant velocity of the stage. The distance between line 102 and the end of the 90° cycle in FIG. 4 represents the last 15 percent of the 90° cycle or 0.235 radians. This last section corresponds to the deceleration of the stage and is shown as area 42c on the cam in FIG. 2. As can be seen, the portion of the curve between 0.235 radians and 1.336 radians is linear, indicating that the distance between the axes of rotation of the cam and cam follower varies in direct proportion to the rotational angle $\theta$ of the cam. By this arrangement, if the cam is rotated at a constant speed, the stage will also be moved at a constant speed through this range.

As will be discussed below, there are a variety of different cam configurations which can include a curved portion configured such that the distance between the axes of rotation of the cam and cam follower varies proportionally with the rotational angle of the cam. In the embodiment implemented by the applicant, a two-lobed cam which generates four scanning cycles per rotation was developed. In this design, the first scan cycle can be defined as the cam rotates from the position shown in FIG. 2 to the position shown in FIG. 3 causing the stage to move from left to right. The second scan occurs as the cam continues to rotate in a clockwise manner and the stage moves from right to left back to its initial position. This sequence will repeat and two more scans will be generated as the cam rotates an additional 180° and completes one full revolution.

In reaching an optimal cam design, several considerations must be taken into account. First, it is desirable to maximize the length of the portion of the scan where the velocity of the stage is constant. As can be appreciated, it is only during this time period where suitable information to generate the autocorrelation signal is available. Accordingly, in the embodiment implemented by the applicant, it was decided that 70° of the 90° cycle (1.1 radians) (available in each quadrant of the lobe and shown as area 42b) would be reserved for a curvature to provide constant velocity motion. The remaining portions 42a, 42c of the cam surface in each quadrant would be used for acceleration and deceleration of the stage. In order to make sure that the acceleration and deceleration are smooth and relatively vibration free, the curvature of portions 42a and 42c of the cam lobes should generate a constant acceleration of the stage.

Another factor that was considered in arriving at a suitable cam design is the fact that the cam must have some minimum radius to provide structural rigidity. In the cam design implemented by the applicant, a minimum radius was chosen to be 1.5 inches.

The cam utilized by the applicant was machined using a computer controlled milling device. A rotating tool was used to cut the shape of the cam from a flat piece of material. In order to insure that the path the tool would follow around the cam would be the same as the cam follower, the diameter of the tool was chosen to be equal to the diameter of the cam follower. The computer program used to define the shape of the cam calculated the radial distance between the center of rotation of the cam to the center of the machining tool or cam follower.

The shape of the cam and the path of the cutting tool was calculated for the first quadrant of the cam in the following manner. The radial distance (R) between the center of rotation of the cam and the cam follower for the acceleration portion of the scan (area 42a) is given by the following equation:

$$R = \frac{(acceleration)\ (\theta)^2}{2} + r_{min} \quad (1)$$

where $\theta$ is the rotational angle of the cam and $r_{min}$ is the minimum radius of the cam which was selected to be 1.5 inches. The acceleration in Equation (1) is given by the following:

$$acceleration = (scan\ velocity)/(0.235\ radians) \quad (2)$$

The scan velocity was chosen to be 1.9 inches per radian in order to provide two inches of linear stage motion in the portion of the scan where the velocity is constant. Two inches of constant velocity motion will produce 335 picoseconds of scan time with a cam of this design and dimensions.

The curvature of the cam in area 42a defined by Equation (1) provides for a constant acceleration to the scan velocity. Once the stage reaches the scan velocity of 1.0 inches per radian, the curvature of the cam is changed to maintain that velocity over area 42b. The equation used to calculate the radius in 42b, from 0.235 radians to 1.335 radians is as follows:

$$R = (scan\ velocity)(\theta - 0.235\ radians) + r_{min} \quad (3)$$

This equation defines the spiral of Archimedes where the radial distances varies directly with the angle of rotation. It is this portion of the scan where the pulse width will be measured.

During the final portion of the scan, from 1.336 radians to $\pi/2$ radians or 90°, the stage is constantly decelerated from the scan velocity down to a rest position with a constant deceleration. The radius of the cam in area 42c to produce this result is given by the following equation:

$$R = (scan\ velocity)\ (\theta - 1.335\ radians) - \quad (4)$$
$$\frac{(acceleration)\ (\theta - 1.335\ radians)^2}{2} + r_{min}$$

Equations (1), (3) and (4) provide a solution in polar coordinates which can be converted to cartesian coordinates for use with the milling tool. Once the solution is converted to cartesian coordinates, the shape of the other quadrants can be transposed by following the following table:

TABLE I

| Quadrant | Conversion |
| --- | --- |
| First | X vs. Y |
| Second | −X vs. Y |
| Third | −X vs. −Y |
| Fourth | X vs. −Y |

The quadrants are numbered in the order they would be interacting with the cam follower such that first quadrant is followed by the second, followed by the third, the fourth and then returning to the first quadrant.

In operation, cam 42 is rotated at a continuous speed causing stage 40 to reciprocate and create a varying change in the path length of beam 10b. The two portions of the beam 10a, 10b are recombined and focused onto the second harmonic crystal 28. The method of gaining information as to the pulse width based on the signal coming out of the second harmonic crystal 28 is similar to the approach used in prior art autocorrelators such as in the Boggy patent cited above.

Figure 5:
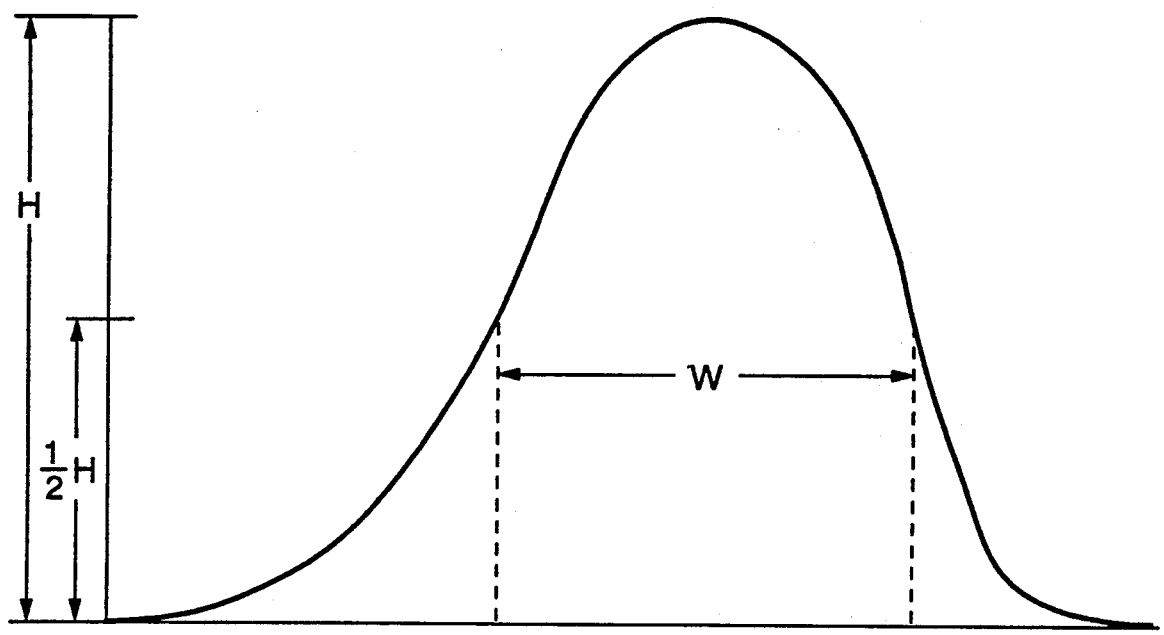
FIG. 5 is a drawing of an autocorrelation trace which might be displayed on an oscilloscope receiving the signal generated by the apparatus of the subject invention.

FIG. 5 illustrates the type of trace that could be observed if the output from photodetector 30 is displayed on an oscilloscope. By convention, pulse widths are usually defined at "full width half maximum" (FWHM). As can be seen in FIG. 5, the height of the pulse is given as H and one-half of the maximum height is $\frac{1}{2}$-H. The width W, at $\frac{1}{2}$-H is defined as the width of the autocorrelation pulse. Based upon the scanning frequency of the oscilloscope, this physical width can be converted into time, usually measured in milliseconds.

In order to convert the pulse width W of the trace displayed on the oscilloscope to the actual width of pulses in the input beam 10, the measured width W is multiplied by a calibration factor. The calibration factor is given by the following formula:

$$calibration\ factor = \frac{scan\ distance}{(duration\ of\ scan)\ (speed\ of\ light)} \quad (5)$$

where the scan distance is twice the length the stage moves during the active scan (the period at constant velocity) and the duration of scan is the length of the time it takes the stage to move the active scan distance. As will be discussed below with reference to the preferred embodiment, a means can be provided to generate a trigger signal for the oscilloscope at both the beginning and end of the scan interval.

Having described the basic elements and theory of operation of the subject invention, the preferred embodiment will now be described in greater detail with reference to FIGS. 6 and 7. In FIGS. 6 and 7, parts identical to those identified in FIG. 1 will be given the same numbers.

As noted above, it is important that the cam be rotated at a constant speed. This can be accomplished using a speed controlled motor 58. One suitable motor is manufactured by Maxon Precision Motors, Part No. 2326. In the preferred embodiment, cam 42 is rotated at a velocity of about 200 revolutions per minute. If the speed of the revolution were increased, the resolution of the traces on the oscilloscope would be improved. However, there is a limit to the rotational speed based on the torque of the motor. More specifically, the torque required from the motor increases as the square of the rotational speed. As the upper limits of the motor are reached, the regulation of the rotational speed deteriorates.

As discussed above, stage 40 follows the movement of the cam 42. As the cam and stage move from the position shown in FIG. 2 to the position shown in FIG. 3, the clockwise rotation of the cam functions to push the stage from left to right. During the next 90° rotation of the cam, the return of the stage is achieved by the action of the biasing means defined by a spring 60 connected between the cam and the stage. During the first 90° of the cycle (going from FIG. 2 to 3), spring 60 acts against the motor, trying to slow the rotation of the cam. In contrast, during the second 90° of the cycle, the spring acts with the motor, urging the cam to rotate faster. Accordingly, good speed regulation circuitry for the motor is important to counteract the changing spring forces.

In addition to the force of the spring placed on the motor, the force reversal at the end of each cycle (from pushing to pulling or vice versa) also effects the motor gears. More specifically, the gears in the motors will slip to some extent due to backlash when the forces are changed. As long as relatively high quality motors and gears are used, this problem can be minimized.

The cam design illustrated in FIGS. 6 and 7 allows for information to be generated during both directions of travel of the stage. In this case, it is desirable to make sure that the path length of the fixed beam 10a is the same as the average path length of beam 10b. The average path length of beam 10b is defined when the stage is in the center position as shown in FIG. 1. If the path lengths of beams 10a and 10b are not the same, the pulse generated when the stage moves in one direction will not overlap the pulse generated when the stage moves in the opposite direction and two pulses will be displayed on the oscilloscope.

In order to facilitate the adjustment of the path length of beam 10a, prism 22 can be adjustable along the axis shown by arrows C in FIG. 7. During operation, the position of prism 22 can be adjusted until the pulses displayed on the oscilloscope overlap indicating that the path lengths of the two beams are matched. The need to provide this adjustment is not present when scanning is performed in only one direction of stage movement.

To facilitate the display of the autocorrelation pulse, it is desirable to have a means for triggering the oscilloscope when the stage has reached its constant velocity and again when it is about to begin deceleration. These trigger signals can be used to synchronize the operation of the oscilloscope.

A number of ways to generate a triggering signal are available. In the illustrated embodiment, a planar flag 62 is mounted on one side of the stage. The flag 62 is designed to pass through a detector 64. The detector 64 consists of a combination LED and photodiode. This detector will generate an output voltage of a first level until such time as the flag passes between the elements blocking light emitted by LED from reaching the detection. This ramp down in voltage is detected and used to generate a signal that will trigger the oscilloscope at the beginning of the scan. As the flag continues to move through the detector, the output voltage will be low. Once the flag passes out of the detector, the voltage level will go up and can be used to generate a trigger signal indicating the end of the scan. The length of flag 62 and its location with respect to detector 64 are arranged so that the signals will be given at both the start and finish of the linear portions of the scan. Of course the leading edge of the flag will become the trailing edge and vice versa when the stage travels in the opposite direction.

The flag and detector arrangement can also be used to provide calibration information. More specifically, the length of the flag will define the physical scan distance. Since the change in the path length of the beam varies by a factor of two with respect to the linear distance of stage movement, the length of the flag can by doubled to derive the value for the scan distance parameter found in Equation (5) above.

Additional calibration information can be derived based on the length of time the flag is blocking the detector 64 since this time period corresponds to the length of the scan. In the preferred embodiment, the output signal of the detector 64 is gated to the oscilloscope to provide a measurement of the value of the duration of the scan referred to in Equation (5).

The particular device shown in FIGS. 6 and 7 can be used to produce autocorrelation traces of pulses having a duration of up to 100 picoseconds. By changing the shape of the cam and adjusting the length of movement of the stage, measurement of pulses ranging from 50 femptoseconds to 350 picoseconds can be achieved.

Figure 8:
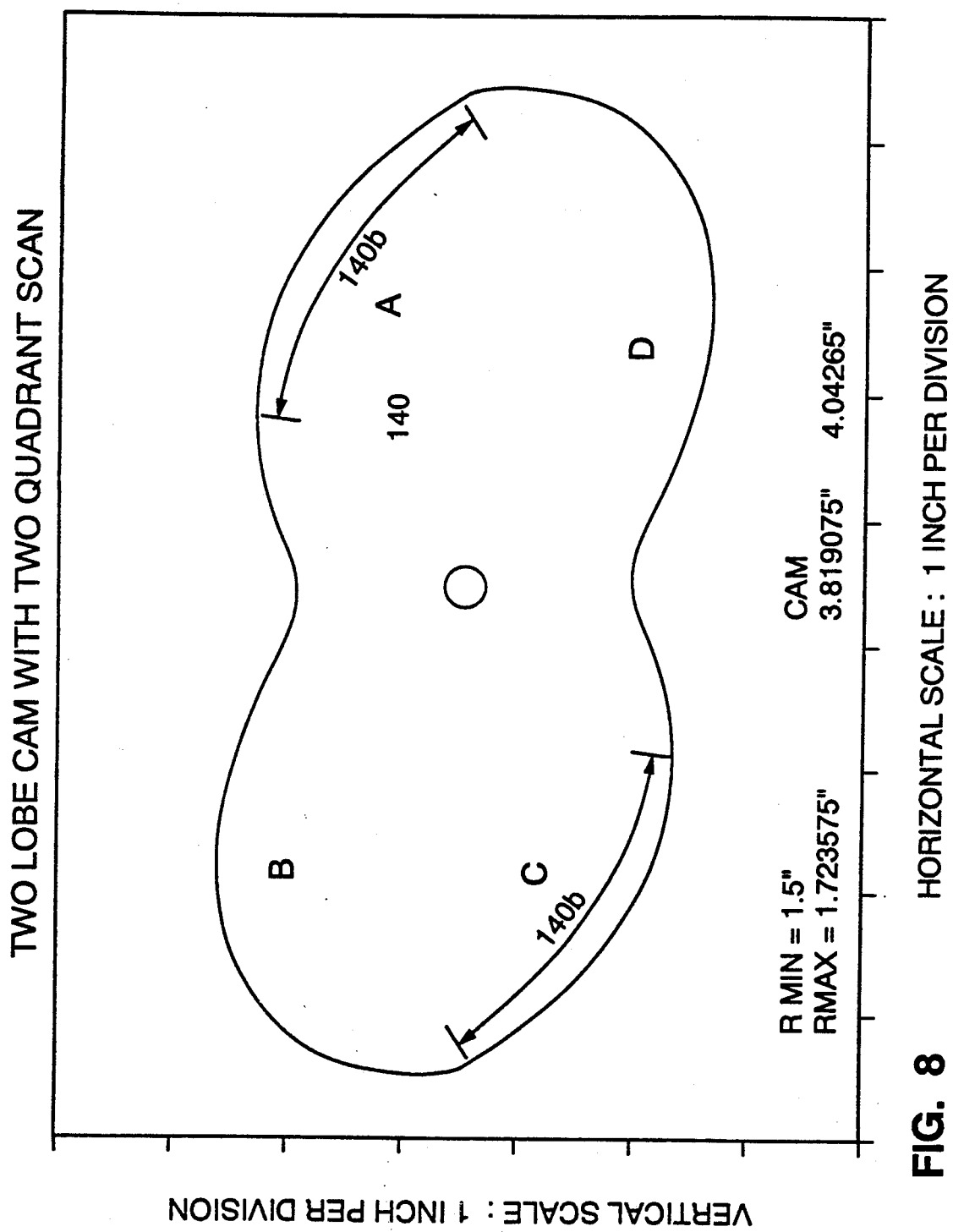
FIG. 8 illustrates the configuration of an alternate cam structure having two lobes and providing two scans per rotation.

As noted above, the two-lobed cam having four scans per rotation represents only one method of implementing the subject invention. A single lobed cam could also be used to provide one active scan per rotation. Another cam configuration is shown in FIG. 8. Cam 140, which also has two lobes, provides only two scans per rotation. More specifically, the areas 140b of the cam having the desired curvature (wherein the radial distance varies proportionally with the rotational axis of the cam) are provided only in quadrants A and C. Quadrants B and D are configured to move the stage back to its initial position as quickly as possible.

Using a cam arranged as in FIG. 8 would only permit scanning of the stage through movement in one direction, for example, left to right in FIG. 1. The return of the stage from right to left would not be used to trigger a scan. This approach clearly provides less scans per revolution and therefore less information than the cam shown in FIGS. 6 and 7. However, as noted above, alignment is much more critical where scans are taken in both directions of the stage movement. Accordingly, if one wanted to relax the alignment criteria, a cam as shown in FIG. 8 would be desirable.

Figure 9:
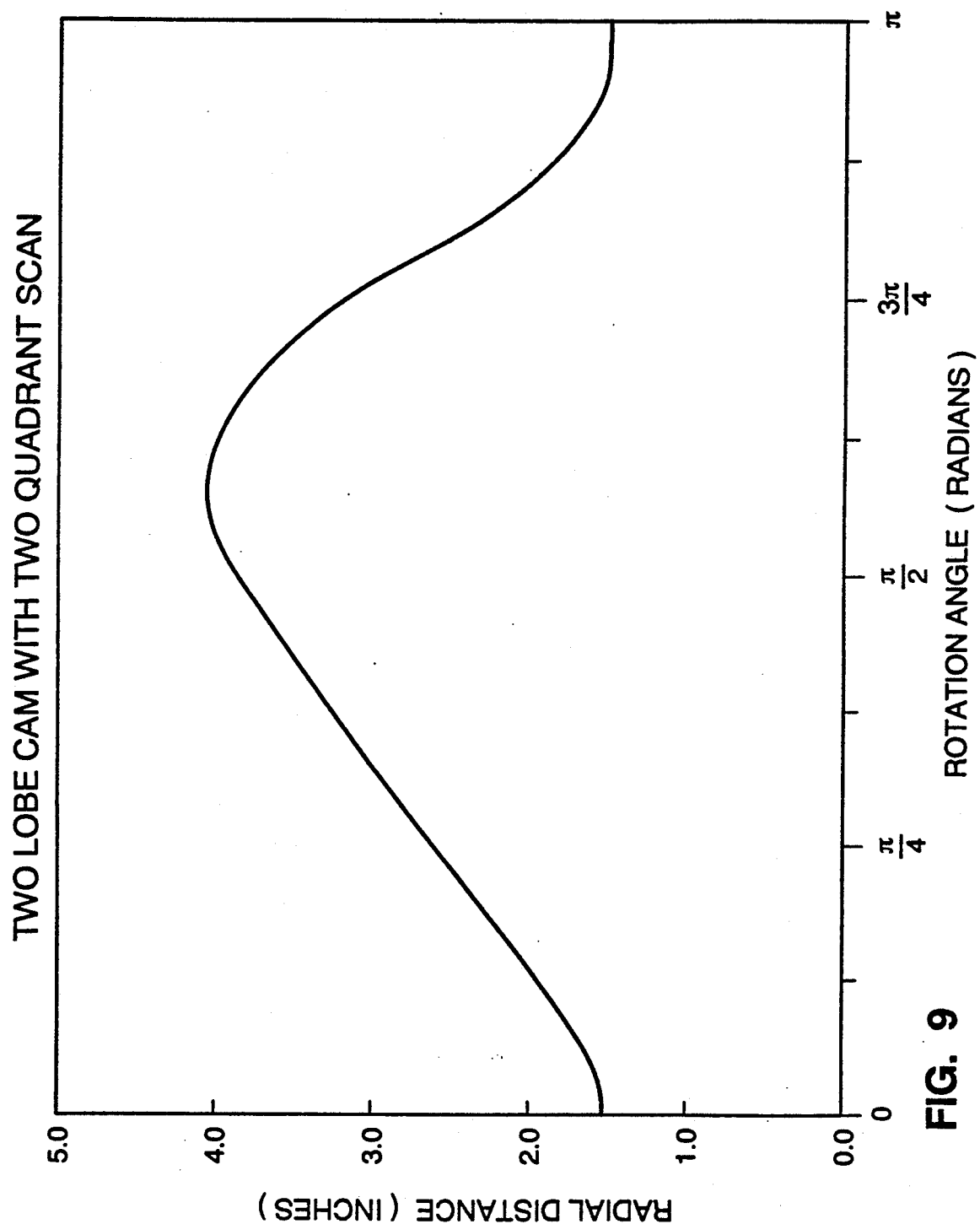
FIG. 9 is a graph, similar to FIG. 4, plotting the displacement of the stage using the cam shown in FIG. 8.

FIG. 9 illustrates a curve showing how the radial distance between the axes of the cam and cam follower varies with respect to the rotation angle with the cam designed as in FIG. 8. As can be seen, in the first 90° ($\sigma/2$ radians) there is a significant portion where the radial distance varies proportionally with the rotation angle. In the second 90° (second quadrant B) there is no linearity, but rather a change designed to smoothly and quickly move the stage back to the starting point.

Figure 10:
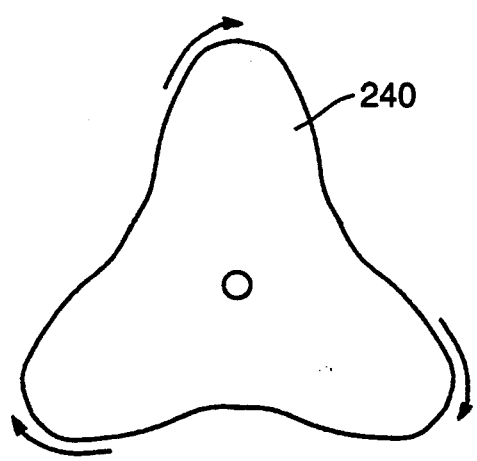
FIG. 10 is another alternative cam configuration having three lobes which provides three scans per rotation.

The cam design is not limited to either a one or a two lobed configuration. As illustrated in FIG. 10, a three lobe cam 240 can be utilized. The configuration shown in FIG. 10 includes three linear scans and three sections for accelerating the stage back to the starting point. The use of this cam, like the use of the cam shown in FIG. 8, will provide scanning in only one direction of motion of the stage. However, the three lobe cam will provide three scans per revolution and therefore while possibly more difficult to fabricate could produce better measurement results.

In summary, there has been provided a new and improved apparatus for generating information about the width of pulses in an optical train using an autocorrelation technique. In the apparatus, the incoming beam is split into two paths. One of the beams is directed to a means for varying the length of the optical path. This means includes a cam rotating at a constant speed. This means also includes a reciprocating stage having a cam follower mounted thereon. As the cam rotates, the stage reciprocates in a manner to vary the path length of the beam of light. In accordance with the subject invention a portion of the curvature of the cam is arranged such that the distance between the rotational axes of the cam and cam follower varies proportionally with the rotational angle of the cam. By this arrangement, a portion of the movement of the stage will be at a constant rate such that the path length of the beam will change at a constant rate. The two beams are then recombined in a second harmonic generation crystal which generates an output signal. The output signal is monitored by a photodetector and may be displayed on an oscilloscope to provide a measurement of the pulse width of the input pulses. The means for producing the optical delay can be used in other devices such as a Michelson type interferometer.

While the subject invention has been described with reference to a preferred embodiment, various other changes and modifications could be made therein by one skilled in the art without varying from the scope and spirit of the subject invention as defined by the appended claims.

I claim:

1. An apparatus for introducing a change in the path length of a beam of light comprising:
   a rotatable cam;
   means for rotating the cam at a constant speed; and
   a reciprocating stage, said stage having mounted thereon a cam follower for engaging the surface of the cam, said stage further including an optical reflector for intercepting and redirecting the beam of light and wherein at least a portion of the surface of the cam has a first curvature configured in a manner such that as the cam is rotated, the stage will be linearly translated, at a constant velocity, to induce a constant rate of change in the path length of said beam of light.

2. An apparatus as recited in claim 1 wherein the configuration of the first curvature of the surface of said cam is arranged such that in operation, the distance between the cam follower and the axis of rotation of the cam varies proportionally with rotational angle of the cam.

3. An apparatus as recited in claim 2 wherein the configuration of the curvature of the remaining surfaces of said cam are arranged to accelerate the stage, at a constant rate, between zero velocity and the constant velocity induced by said first curvature.

4. An apparatus as recited in claim 1 wherein rotational axis of the cam is aligned with the axis of movement of the stage.

5. An apparatus as recited in claim 1 wherein said the beam of light is directed to said optical reflector parallel to the axis of the movement of said stage.

6. A device for autocorrelating an optical radiation signal comprising:
   means for producing first and second optical beams from the optical radiation signal;
   means for combining said first and second optical beams to produce an autocorrelation signal proportional to the product of the two beams; and
   means for introducing a delay in one of the optical beams, said means including a rotatable cam and a reciprocating stage, said stage having mounted thereon a cam follower for engaging the surface of the cam, said stage further including an optical reflector for intercepting and redirecting said one optical beam of light and wherein at least a portion of the surface of the cam has a first curvature configured in a manner such that as the cam is rotated, the stage will be linearly translated, at a constant velocity, to induce a constant rate of change in the path length of said first optical beam.

7. An apparatus as recited in claim 6 wherein the configuration of the first curvature of the surface of said cam is arranged such that in operation, the distance between the cam follower and the axis of rotation of the cam varies proportionally with rotational angle of the cam.

8. An apparatus as recited in claim 7 wherein the configuration of the curvature of the remaining surfaces of said cam are arranged to accelerate the stage, at a constant rate, between zero velocity and the constant velocity induced by said first curvature.

9. An apparatus as recited in claim 6 wherein rotational axis of the cam is aligned with the axis of movement of the stage.

10. An apparatus as recited in claim 6 wherein said one optical beam is directed to said optical reflector parallel to the axis of the movement of said stage.

11. An apparatus as recited in claim 6 wherein said cam is configured with two lobes and with each of said lobes including two separate surfaces each having a configuration to cause said stage to move with a constant velocity.

12. An apparatus as recited in claim 6 further including a means for rotating the cam at a constant rate of speed.

13. An apparatus as recited in claim 6 further including a biasing means, connected between the cam and stage for maintaining contact between the cam and the cam follower.

14. An apparatus as recited in claim 6 wherein said means for combining said first and second optical beams comprises a doubling crystal.

15. An apparatus as recited in claim 14 wherein said optical radiation signal is defined by a series of short pulses and wherein said doubling crystal functions to produce an output at double the frequency of the radiation signal when the pulses in the first and second optical beams are in phase.

16. An apparatus as recited in claim 6 wherein said combined autocorrelation signal is supplied to an oscilloscope.

17. An apparatus as recited in claim 6 further including a means for generating a trigger signal when the movement of the stage has reached a constant velocity.

18. An apparatus as recited in claim 17 wherein said means for generating a trigger signal includes a flag and a light detecting means one of which being connected to the stage, said light detector means for generating the trigger signal when the flag passes thereby, said flag and light detecting means being positioned such that the trigger signal will be generated when the stage reaches a constant velocity.

19. An apparatus as recited in claim 17 wherein said trigger signal is supplied to an oscilloscope.

20. A method for autocorrelating an optical radiation signal comprising the steps of:
dividing said optical signal into first and second optical beams;
introducing a delay into one of said optical beams by directing said one optical beam to a reflector mounted on a movable stage and wherein the movement of the stage is induced through interaction with a rotating cam and wherein a portion of the surface of said cam has a first curvature configured to cause said stage to translate with a constant velocity; and
combining said first and second optical beams to produce an autocorrelation signal proportional to the product of the two beams.

21. A method as recited in claim 20 wherein said one optical beam is directed parallel to the axis of movement of the stage.

22. A method as recited in claim 20 wherein said cam is rotated at a constant rate of speed.

23. A method as recited in claim 20 wherein said first and second optical beams are combined in a doubling crystal.

24. A method as recited in claim 20 further including the step of supplying the autocorrelation signal to an oscilloscope.

25. A method as recited in claim 24 further including the step of generating a trigger signal when said stage has reached a constant velocity.

26. A method as recited in claim 25 further including the step of supplying the trigger signal to an oscilloscope.

27. An apparatus for introducing a change in the path length of a beam of light comprising:
a rotatable cam having a curved surface;
means for rotating the cam at a constant speed; and
a reciprocating stage, said stage having mounted thereon a cam follower for engaging the surface of the cam, said stage further including an optical reflector for intercepting and redirecting beam of light travelling parallel to the axis of movement of the stage such that as the cam is rotated, the stage will be translated inducing a change in the path length of the beam of light and wherein at least a portion of the surface of the cam has a first curvature configured in a manner such that the rate of change in path length is constant over time.

28. An apparatus as recited in claim 27 wherein the configuration of the first curvature of the surface of said cam is arranged such that in operation, the distance between the cam follower and the axis of rotation of the cam varies proportionally with rotational angle of the cam.

* * * * *

UNITED STATES PATENT AND TRADEMARK OFFICE
CERTIFICATE OF CORRECTION

PATENT NO.   : 5,033,853

DATED        : July 23, 1991

INVENTOR(S)  : George Frangineas, Jr.

It is certified that error appears in the above - identified patent and that said Letters Patent is hereby corrected as shown below:

Column 7, line 67, change "1.0" to --1.9--.

Signed and Sealed this

Twenty-seventh Day of April, 1993

*Attest:*

MICHAEL K. KIRK

*Attesting Officer*      *Acting Commissioner of Patents and Trademarks*